No. 616,251. Patented Dec. 20, 1898.
F. O'NEILL.
MACHINE FOR MANUFACTURING GLASSWARE.
(Application filed Jan. 21, 1898.)
(No Model.) 3 Sheets—Sheet 1.
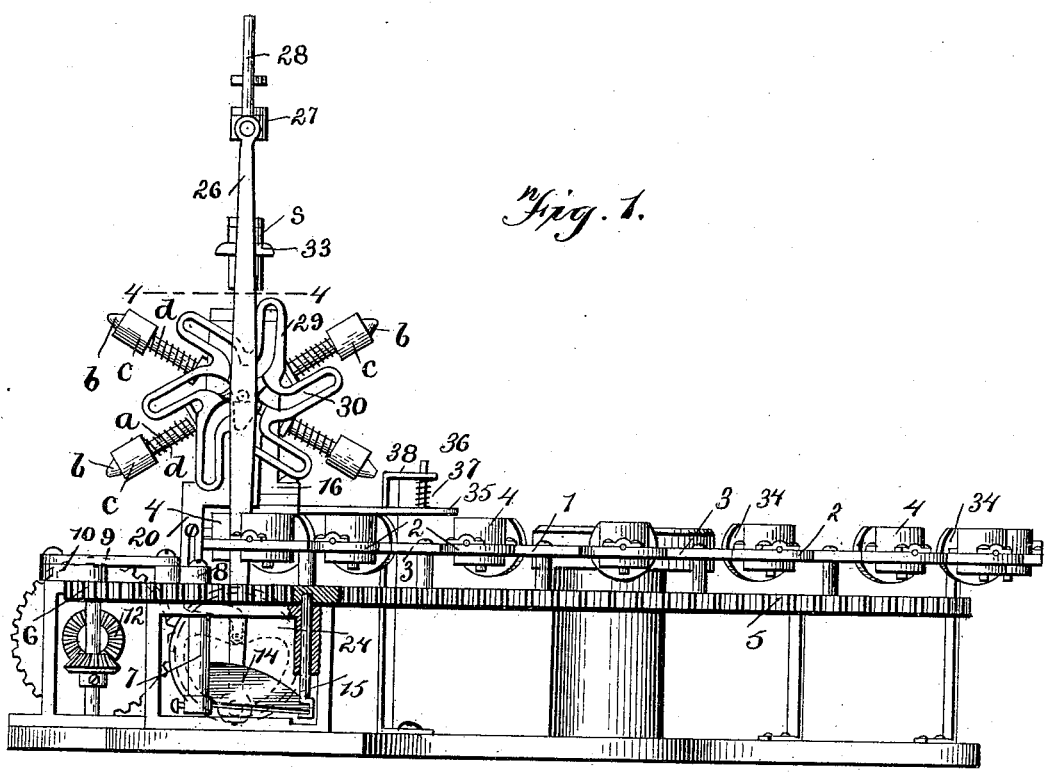
Witnesses
Geo. E. Frych.
B. E. Seitz.
Inventor
Frank O'Neill
By J. M. Nesbit
Attorney No. 616,251. Patented Dec. 20, 1898.
F. O'NEILL.
MACHINE FOR MANUFACTURING GLASSWARE.
(Application filed Jan. 21, 1898.)
(No Model.) 3 Sheets—Sheet 2.
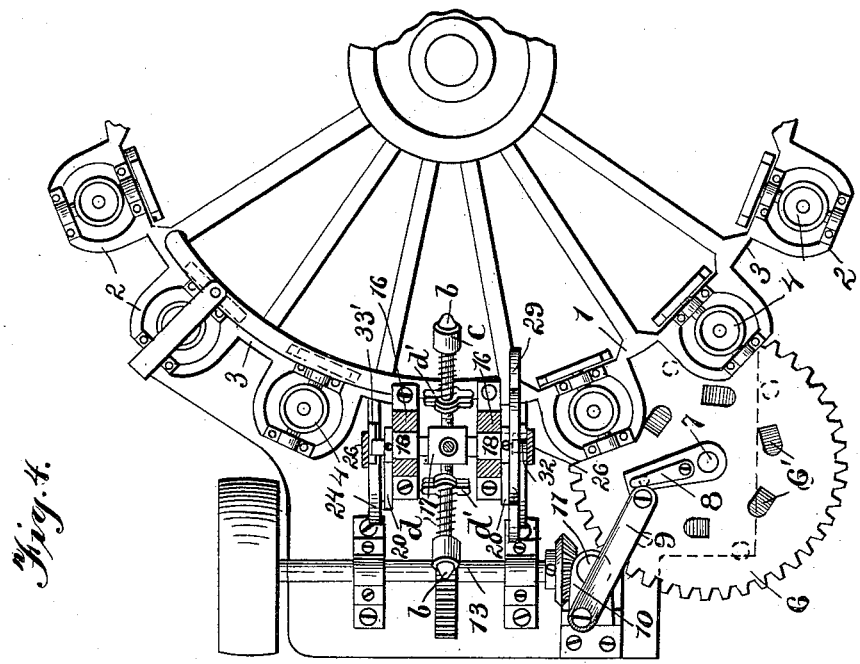
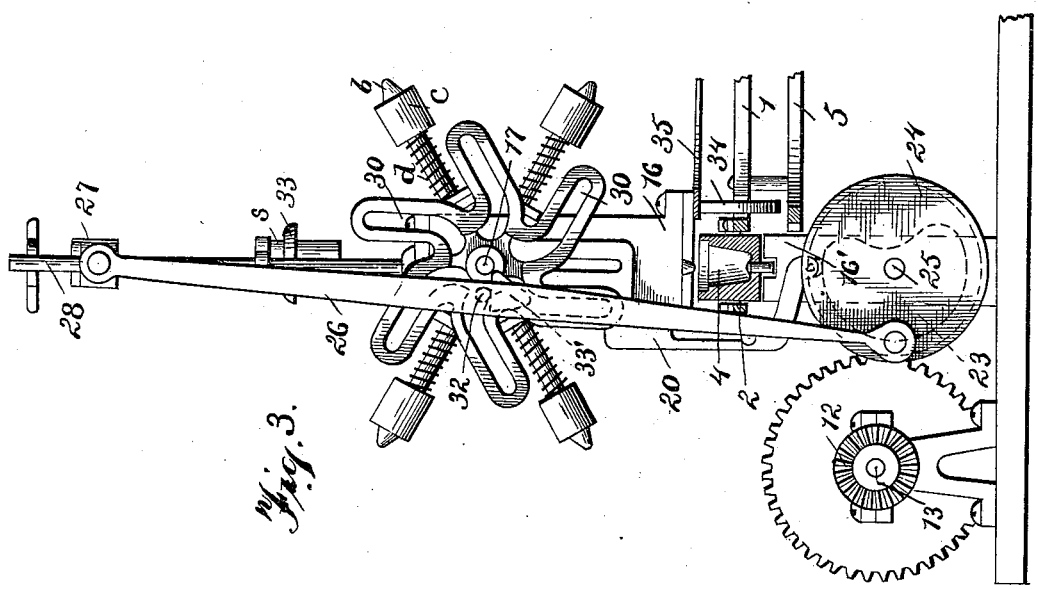
Witnesses
Inventor
Attorney No. 616,251. Patented Dec. 20, 1898.
F. O'NEILL.
MACHINE FOR MANUFACTURING GLASSWARE.
(Application filed Jan. 21, 1898.)
(No Model.) 3 Sheets—Sheet 3.
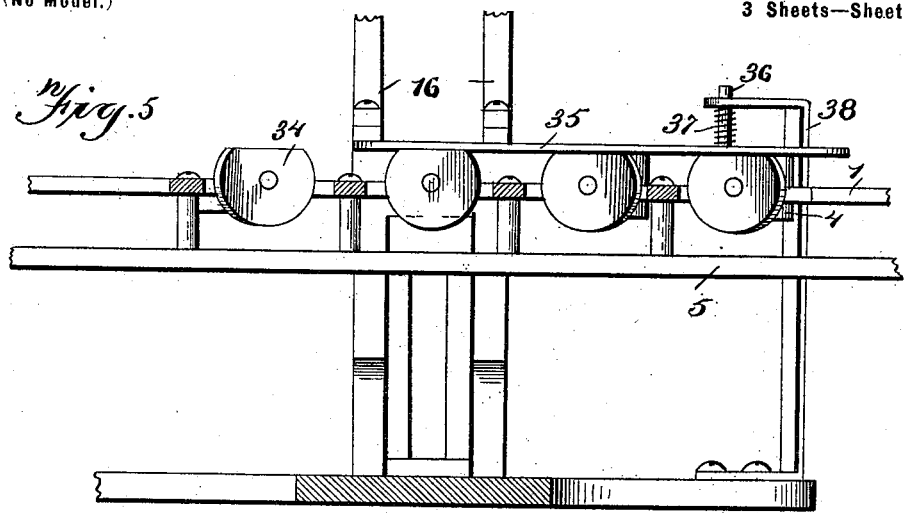
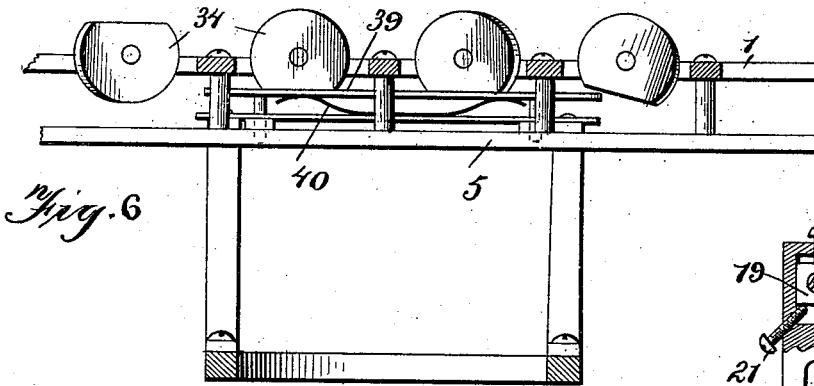
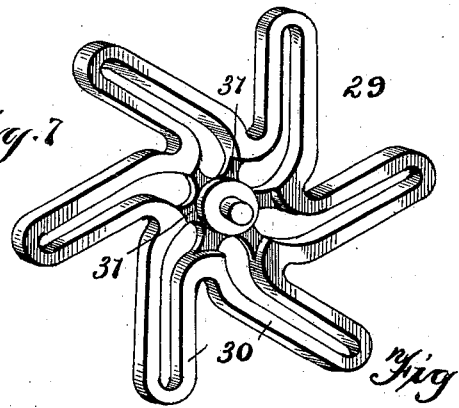
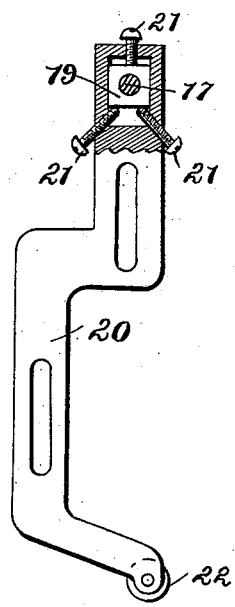
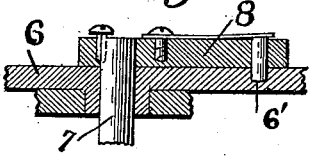
Witnesses
Geo. E. Frech
B. E. Seitz
Inventor
Frank O'Neill
By J. M. Nesbit
Attorney
THE NORRIS PETERS CO., PHOTO-LITHO., WASHINGTON, D. C.

UNITED STATES PATENT OFFICE.

FRANK O'NEILL, OF CICERO, INDIANA, ASSIGNOR OF ONE-FOURTH TO CHRISTIAN ARDUSER, OF SAME PLACE.

MACHINE FOR MANUFACTURING GLASSWARE.

SPECIFICATION forming part of Letters Patent No. 616,251, dated December 20, 1898.

Application filed January 21, 1898. Serial No. 667,446. (No model.)

*To all whom it may concern:*

Be it known that I, FRANK O'NEILL, a citizen of the United States, residing at Cicero, in the county of Hamilton and State of Indiana, have invented new and useful Improvements in Machines for the Manufacture of Glassware, of which the following is a specification.

This invention relates to machines for the manufacture of glassware, and has particular reference to certain improvements in the construction and relative arrangement of the plungers, the actuating means, and the mold-carrier.

The invention also includes improved mechanism for moving the plungers successively to position for pressing.

The invention consists in the novel features of construction and combination and arrangement of parts hereinafter fully described and claimed, and illustrated by the drawings.

Referring to the accompanying drawings, Figure 1 is a side elevation of my improved machine shown partly in section. Fig. 2 is a rear elevation of the same, omitting the power mechanism, parts of the machine being shown in section, the positions of the parts in Figs. 1 and 2 being as when a plunger is pressed into a mold. Fig. 3 is an elevation of the plunger-actuating mechanism, the mold and one side of the carrier being shown in section, the position of the parts in this view being as when the plunger is withdrawn from the mold and just prior to turning the next plunger to operative position. Fig. 4 is a sectional plan view on line 4 4 of Fig. 1. Figs. 5 and 6 illustrate the mold-adjusting mechanism. Fig. 7 is a detail view of the spider for intermittently rotating the plunger-head. Fig. 8 is a similar view of one of the plunger-head bearings. Fig. 9 is a detail view of gear 6 and dog 8.

The outer periphery of the mold-carrier 1 is scalloped to form radially-projecting mold-supports 2, which alternate with intervening open spaces 3, and trunnioned in each support is a revoluble mold 4. Beneath and secured to wheel 1 is large circular gear 5, to which intermittent rotary motion is imparted through gear 6. It will be noted that gear 5 is of less diameter than the circle of molds, for the purpose presently to be stated.

Gear 5 is loosely mounted on upright shaft 7, and to the upper extremity of the latter is secured spring-dog 8, which is connected by link 9 to crank 10 on the upper end of shaft 11, the latter being connected by bevel-gearing 12 with power-shaft 13. Thus the dog is given vibratory movement over the gear 5 and engages successively beveled depressions 6' in its top surface, and thus imparts thereto and to carrier 1 an intermittent rotary movement. Cam 14, carried by the lower end of shaft 11, is embraced by vertically-moving bolt 15, and the relative position and movements of the parts are such that the bolt is raised into one of several apertures in the bottom of wheel 5 just as the latter has completed a partial turn, and thus gears 5 and 6 and the carrier are held locked during the pressing operation, as will be more particularly referred to hereinafter.

The parallel vertically-slotted uprights 16, overhanging the periphery of the carrier and the molds, are passed successively thereunder and positioned over post 16' to receive the plungers. The latter are arranged radially on the rotatable head or shaft 17. Each plunger consists of stem *a*, carrying at its outer end plunger-head *b*, and cap *c*, which is held normally projected over the plunger by spring *d*, coiled about the stem, the tension of the spring being regulated by nut *d'*.

Shaft 17 extends through boxes 18, slidable in the slots of uprights 16, and is journaled in boxes 19, adjustably secured in angle-bars 20 by screws 21, so that the position of the shaft may be varied vertically with respect to said bars. Bars 20 are slotted to move vertically over guide-pins projecting from uprights 16 and at their lower ends carry friction-wheels 22, which travel on cam-wheels 23, mounted on shaft 24, the latter being journaled transverse the bases of uprights 16. Also secured to this shaft are wheels 25, which are eccentrically connected by pitmen 26 to cross-head 27 above the plungers and which is reciprocated by the pitmen on vertical guides 28.

Secured to one end of shaft 17 is spider 29, the same consisting of six tangentially-arranged longitudinally-slotted arms 30. The inner ends of the arm-slots communicate with the central depression 31 in the outer side of the spider, and working in said slots and depression is pin 32, projecting from one of pitmen 26.

The plungers are arranged in pairs which aline through shaft 17, so that when one plunger is in active position its alining plunger projects vertically to be embraced by cup 33, carried by cross-head 27, and in this way pressure is applied for moving the plunger into the mold. As the pitmen reciprocate vertically and vibrate laterally in reciprocating the cross-head, pin 32, projecting from one of them, works in the spider-slots and depression and effects the turning thereof and of the plungers, so as to bring the latter successively to operative position, as before stated. After each pressing operation the pitmen raise the cross-head sufficiently to free the cup from the plunger, this movement, however, being preceded by the elevation of the plunger-shaft through the medium of bars 20 and cam-wheels 23. The adjustment and movement of the several parts are such that the carrier is moved to bring the next mold to operative position while the plunger-shaft is raised and the carrier is at rest and locked, as before explained, when the plungers are in action.

By referring to Figs. 1 and 4 it will be noted that when the pitmen are depressing a plunger into a mold their position is upright or vertical and parallel with said plunger, so that a direct downward pull is made. The carrier being at rest, the pitmen vibrate into spaces 3 on opposite sides of the active mold and recede from said spaces after the pressing operation in ample time to avoid interference with the movement of the carrier.

Lifts 33', slightly curved on their upper ends, are secured to the inner sides of pitmen 26, and when the latter are in their lowermost position, as when pressing a plunger into a mold, said lifts move beneath the extended extremities of plunger-shaft 17, and when the pitmen begin to rise the lifts push upward on the shaft and materially assist bars 20 and wheels 23 in withdrawing the plunger from the mold. The elongated curved upper ends of the lifts permit of this action before they are moved out of engagement with the shaft.

To the inner trunnion of each mold 4 is secured a disk 34, flat on one edge, and as the molds approach the press said disks pass beneath curved guiding-strip 35, upon which they roll until their flat edges engage the same, and in this position they remain, with the molds uppermost, until they pass from beneath the plungers. One end of strip 35 is secured to the overhanging portion of uprights 16, while its opposite end is yieldably held by pin 36 and spring 37, in conjunction with bracket 38. Beneath a convenient portion of the carrier-wheel, at a point removed from the press, is strip 39, held normally raised by upwardly-pressing leaf-spring 40 for acting on disks 34 and reversing the position of the molds, so that the molded articles may drop therefrom, the action of said strip in reversing the molds being the same as strip 35 when righting them.

Having thus fully described my invention, what I claim as new, and desire to secure by Letters Patent, is—

1. An improved machine for the manufacture of glassware, consisting of an overhanging support, a plunger movable vertically therein, a mold-carrier at one side of the support provided with separated projecting brackets, the brackets being adapted to pass, successively, beneath the overhanging support, molds in the carrier-brackets adapted to aline with the plunger, actuating means beneath the overhanging support, and pitmen connecting the actuating means and the plunger for operating the latter, the pitmen vibrating in the mold-separating spaces, substantially as shown and described.

2. An improved machine for the manufacture of glassware, consisting of a plunger, molds, a mold-carrier having mold-supports separated by open spaces and adapted to move the molds, successively beneath the plunger, plunger-actuating mechanism in line with the pressing mechanism and the active mold, and members connecting the plungers and actuating mechanism adapted to move into the open spaces of the carrier on opposite sides of the mold and in position parallel with the alined plunger, mold and plunger-actuating mechanism, substantially as shown and described.

3. An improved machine for the manufacture of glassware, consisting of a plunger, a carrier, molds thereon separated by intervening open spaces and adapted to be moved, successively, into line with the plunger, plunger-actuating mechanism beneath the plunger and active mold, and pitmen connecting the actuating mechanism and plunger and paralleling the same through the spaces on opposite sides of the active mold during the pressing operation, substantially as shown and described.

4. An improved machine for the manufacture of glassware, consisting of a circular rotatable carrier, molds projected from the periphery thereof, the molds being separated by intervening open spaces, vertically-reciprocating pressing mechanism above the circle of molds, actuating mechanism beneath the plane of the carrier and in line with the pressing mechanism and active mold, pitmen connecting the actuating and pressing mechanisms and adapted to be reciprocated vertically and vibrated laterally by the actuating mechanism, the pitmen paralleling said alined mechanisms by extending into the spaces separating the molds during the pressing operation, substantially as shown and described.

5. Improved pressing mechanism for machines for the manufacture of glassware, consisting of a series of rotatable plungers, a single spider rotatable with the plungers having its arms slotted and the slots at their inner ends communicating, a vertically-reciprocating laterally-vibrating member, and a projection on said member adapted to work in the slots of the spider for moving the plungers, successively, to operative position, substantially as shown and described.

6. Improved pressing mechanism for machines for the manufacture of glassware, consisting of a series of plungers arranged radially on a rotatable shaft, a spider rotatable with the shaft and having its arms slotted tangentially, the spider having one face centrally depressed to place the several tangential slots in communication, a vertically-reciprocating laterally-vibrating member, and a projection thereon extending into the spider and working in the slots and depression thereof for turning the same and bringing the plungers, successively, to operative position, substantially as shown and described.

7. The combination with a vertically-reciprocating plunger, a plunger-depressor, plunger-elevating mechanism, vertically-reciprocating laterally-vibrating pitmen for raising and lowering the plunger-depressor, and lifts on the pitmen for engaging the plunger during the upward movement of the pitmen and thus assisting in elevating the plunger, substantially as shown and described.

8. The combination of a vertically-reciprocating rotatable shaft, plungers arranged radially thereon, mechanism for intermittently rotating the shaft to bring the plungers, successively, to operative position, devices for raising the shaft, a plunger-depressor, pitmen for raising and lowering the depressor, and lifts on the pitmen for engaging the plunger-shaft extremities during the upward movement of the pitmen and thus assist in elevating the plungers, substantially as shown and described.

9. The combination with the plunger-shaft and supports therefor, of boxings for the shaft adjustable vertically in the supports, substantially as shown and described.

10. The combination with the plunger-shaft and vertically-reciprocating and vertically-slotted supports therefor, of boxings for the shaft in the slots in the supports, and screws for securing the boxes at desired adjustment in the support-slots, substantially as shown and described.

11. The combination of a rotatable series of plungers, a spider rotatable therewith, and actuating mechanism operatively engaging the spider for moving the plungers, successively, to operative position.

12. The combination of a rotatable series of plungers, a single spider rotatable therewith, and vertically-reciprocating laterally-vibrating actuating mechanism operatively engaging the spider for moving the plungers, successively, to operative position.

13. The combination of the overhanging plunger-support, a mold-carrier movable beneath the same, a horizontal strip fixed at one end adjacent the support and at its free portion carrying a vertically-extending bolt, the overhanging bracket embracing the bolt, a downwardly-pressing spring in engagement with the strip, molds rotatable in the carrier, and a disk rotatable with each mold and having a flat edge adapted to bear against the strip, substantially as shown and described.

In testimony whereof I have hereunto set my hand in presence of two subscribing witnesses.

FRANK O'NEILL.

Witnesses:
OTTO JAEGER,
JNO. F. HOLLAND.